United States Patent
Loikkanen et al.

(10) Patent No.: US 8,415,933 B2
(45) Date of Patent: Apr. 9, 2013

(54) BUCK OR BOOST DC-DC CONVERTER

(75) Inventors: Mikko T. Loikkanen, Oulu (FI); Juha O. Hauru, Pummimiehentie (FI); Ari Kalevi Väänänen, Oulu (FI)

(73) Assignee: National Semiconductor Corporation, Santa Clara, CA (US)

( * ) Notice: Subject to any disclaimer, the term of this patent is extended or adjusted under 35 U.S.C. 154(b) by 299 days.

(21) Appl. No.: 12/971,519

(22) Filed: Dec. 17, 2010

(65) Prior Publication Data

US 2012/0153915 A1  Jun. 21, 2012

(51) Int. Cl.
*G05F 1/613* (2006.01)
*G05F 1/40* (2006.01)

(52) U.S. Cl.
USPC .............. 323/225; 323/283; 323/285

(58) Field of Classification Search .......... 323/222, 323/225, 271, 282–285, 351
See application file for complete search history.

(56) References Cited

U.S. PATENT DOCUMENTS

| | | | |
|---|---|---|---|
| 7,176,667 B2 * | 2/2007 | Chen et al. | 323/282 |
| 7,432,689 B2 * | 10/2008 | Miller et al. | 323/259 |
| 7,804,282 B2 * | 9/2010 | Bertele | 323/222 |
| 7,843,177 B2 * | 11/2010 | Ho et al. | 323/222 |
| 7,994,762 B2 * | 8/2011 | de Cremoux et al. | 323/271 |
| 2010/0148740 A1 * | 6/2010 | Saitoh | 323/283 |
| 2011/0169466 A1 * | 7/2011 | Kuan et al. | 323/282 |

* cited by examiner

*Primary Examiner* — Jessica Han
(74) *Attorney, Agent, or Firm* — Andrew S. Viger; Wade J. Brady, III; Frederick J. Telecky, Jr.

(57) ABSTRACT

A control circuit for controlling a DC-DC converter, with the converter including an inductor and associated switching circuitry, with the switching circuitry including a first transistor switch connected intermediate an input voltage terminal and a first terminal of the inductor, a second transistor switch connected intermediate the first terminal of the inductor and a circuit reference, a third transistor switch connected intermediate a second terminal of the inductor and an output voltage terminal and a fourth transistor switch connected intermediate the second terminal of the inductor and the circuit reference. Mode control circuitry responsive to separate buck and boost comparators and configured to cause the switching circuitry to switch among a pass phase where the first and second transistor switches are ON, a boost phase where the first and third transistors are ON and a buck phase where the second and third transistors are ON, with first selected switching periods beginning operation in the pass phase followed, in response to an output of the buck comparator, with operation in the buck phase and with second selected switching periods beginning operation in the pass phase followed, in response to an output of the boost comparator, to operation in the boost phase.

21 Claims, 9 Drawing Sheets

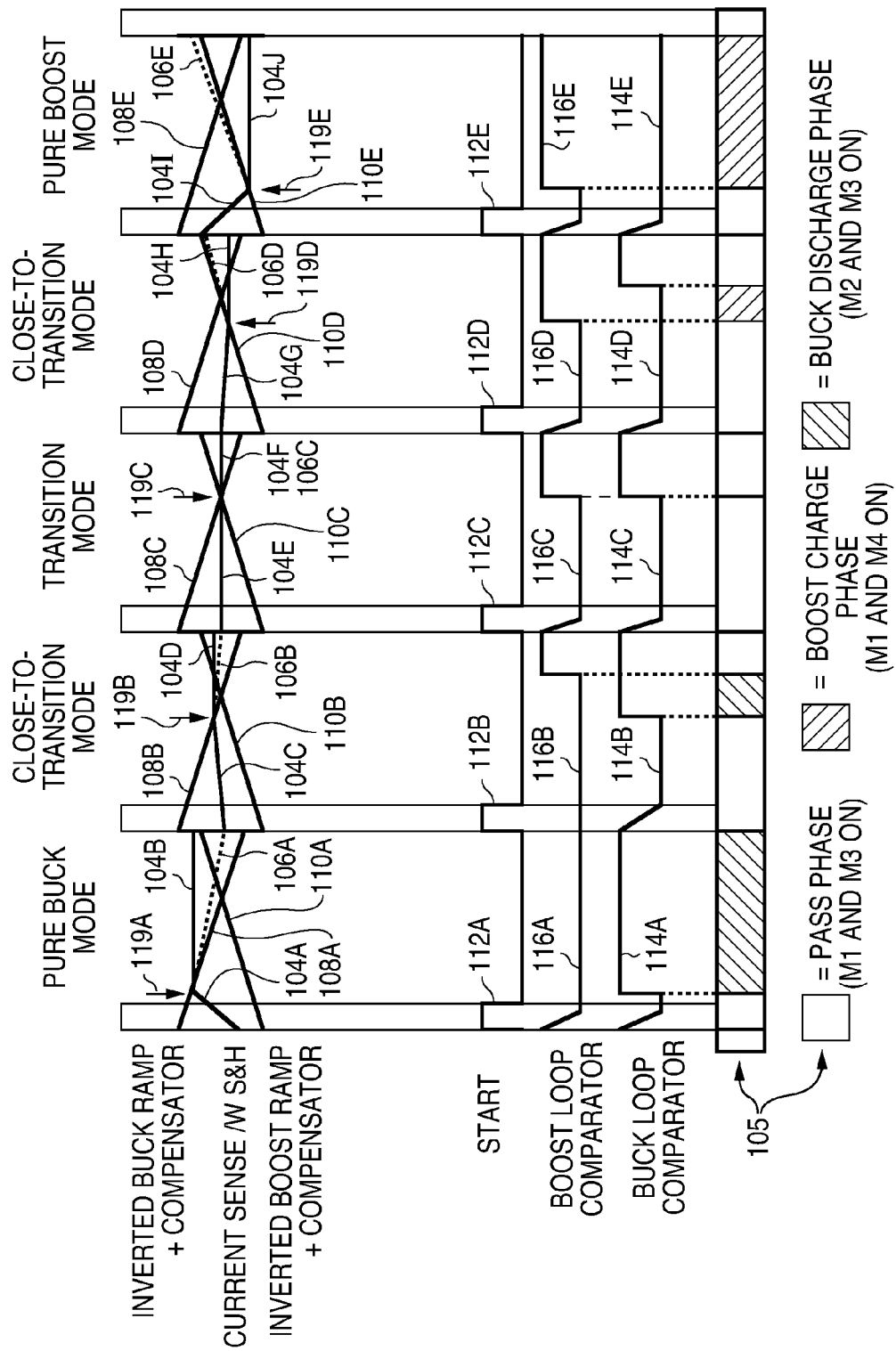

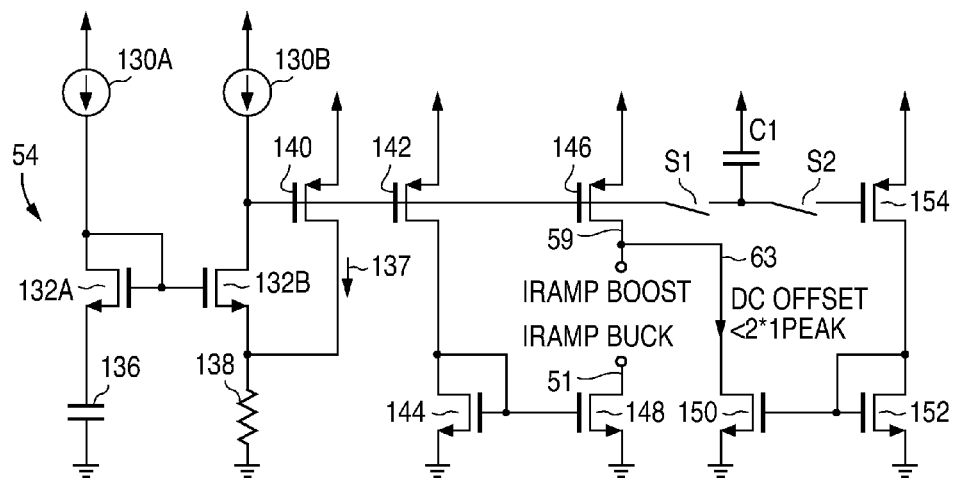
FIG. 10
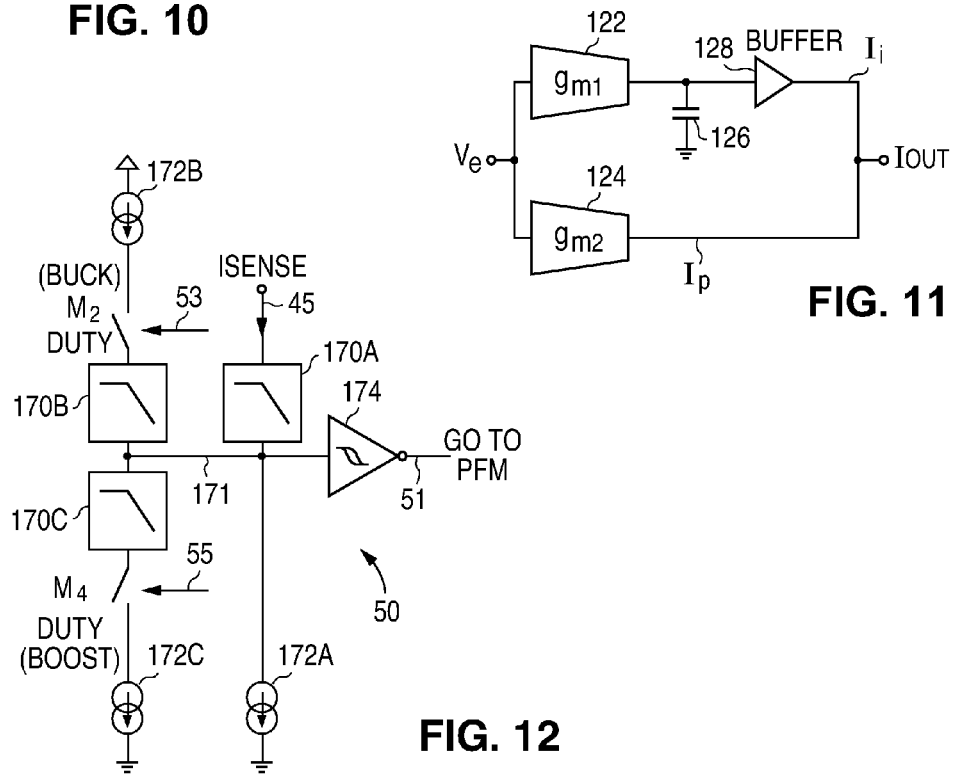
FIG. 11
FIG. 12

BUCK OR BOOST DC-DC CONVERTER

BACKGROUND OF THE INVENTION

1. Field of the Invention

The present invention relates generally to DC-DC converters and in particular to converters capable of operating in a step-down mode (buck) and in a step-up mode (boost) and smoothly transitioning between those modes.

2. Description of Related Art

DC-DC converters using various switching modes are commonly used to convert a DC input voltage to a regulated DC output voltage for powering a load. In a typical application input voltage Vin is provided by battery power source which has a relatively high output voltage when freshly charged, with that output voltage dropping as the battery becomes discharged. By way of example, assume that the charged battery voltage is initially +8 volts, with that voltage dropping to +5 volts as the battery becomes discharged and assume that the regulated output voltage supplied to a load is at +6 volts. Initially the converter needs to step down the voltage from +8 volts to +5 volts thereby requiring buck mode operation. Once the battery has discharged to +4 volts, a boost operating mode is required. When the battery voltage is near the output voltage of +5 volts, some sort of transition operating mode would be beneficial.

FIG. 1 is a diagram of an exemplary prior art DC-DC switching circuit 20 capable of both boost and buck operation. The control circuitry and output filter capacitor are not depicted. An inductor L1 is provided for storing energy received from the power source Vin connected to an input terminal 20A during a charge phase, with that energy then being transferred to the load at Vout connected to output terminal 20B during a discharge phase.

For typical buck operation, P type transistor switch M1 and N type transistor switch M2 are switched ON and OFF whereas P type transistor switch M3 remains constantly ON and N type transistor switch M4 remains constantly OFF. During the charge phase M1 is turned ON and M2 is turned OFF, with M2 being turned OFF first so that Vin is not temporarily shorted to ground. The voltage across the inductor is fixed at about VL=Vin−Vout, with the current increasing somewhat linearly and having a slope proportional to VL. When the inductor current reaches some peak value, transistor M1 is turned OFF and M2 is then turned ON thereby ending the charge phase and starting the discharge phase. The voltage VL across inductor L is again fixed at VL=Vout−0 with the direction of the current reversing so that the inductor L discharging into the filter capacitor (not depicted) and the load (not depicted). Regulator operation controls the duty cycle D which determines the output voltage Vout magnitude as follows for buck operation:

$$Vout=D(Vin) \qquad \text{Eq. (1)}$$

where D is the duty cycle of switch M1 M1$ot$/(M1$ot$+M2$ot$) with M1$ot$ being the ON time for switch M1 and M2$ot$ being the ON time for switch M2, with the sum being the duration of the switching period Ts.

(Equation (1) assumes continuous conduction operation where inductor L is always conducting current in one direction or the other.)

As can be seen from Eq. (1), since D can never exceed one, the largest theoretical output voltage Vout for buck operation is Vin.

Note that transistor M2 acts as a rectifier and could be replaced with a diode. (Diode D1 is a body diode associated with M2 and not a separate diode.) There are advantages to replacing a diode with a transistor and switching the transistor ON and OFF as required, with this approach being referred to as synchronous rectification.

For typical boost operation, P type transistor switch M1 remains constantly ON and N type transistor switch M2 remains constantly OFF. During the charge phase, transistor M4 is ON so that the voltage VL across the inductor is VL=Vin−0. Thus the current though inductor L increases linearly at a rate proportional to Vin. Once the current through inductor L has increased to a peak value, M4 is turned OFF and M3 is turned ON so that inductor L discharge current will flow to the filter capacitor and load.

Once again, the duty cycle D is controlled to provide the desired regulated output voltage Vout in accordance with the following equation:

$$Vout=(Vin)/(1-D) \qquad \text{Eq. (2)}$$

where D is defined above in connection with Eq. (1).

(Equation (2) also assumes continuous conduction operation where inductor L is always conducting current in one direction or the other.)

As can be seen from Eq. (2), since D can never exceed one, the smallest theoretical output voltage Vout for boost operation is Vin.

Also, transistor M3 could be replaced with a diode but synchronous operation using a transistor is usually preferred.

Converter operation in the region between the buck and boost operating modes where Vin and Vout are nearly equal to one another can become problematic. There is a need for a DC-DC converter capable of both buck and boost mode operation and further capable of a smooth transition between these operating modes.

BRIEF DESCRIPTION OF THE DRAWINGS

FIG. 3 is a timing diagram illustrating the operation of the FIG. 2 DC-DC converter.

FIG. 10 is a diagram of the circuitry used to produce the boost and buck artificial current ramp signals for use in the respective buck and boost control loops.

FIG. 11 is a block diagram of a PI compensator using transconductance amplifier elements.

FIG. 12 is a simplified block diagram of mode monitoring circuitry for controlling switching between PWM and PFM operating modes.

DETAILED DESCRIPTION OF THE INVENTION

Figure 2:
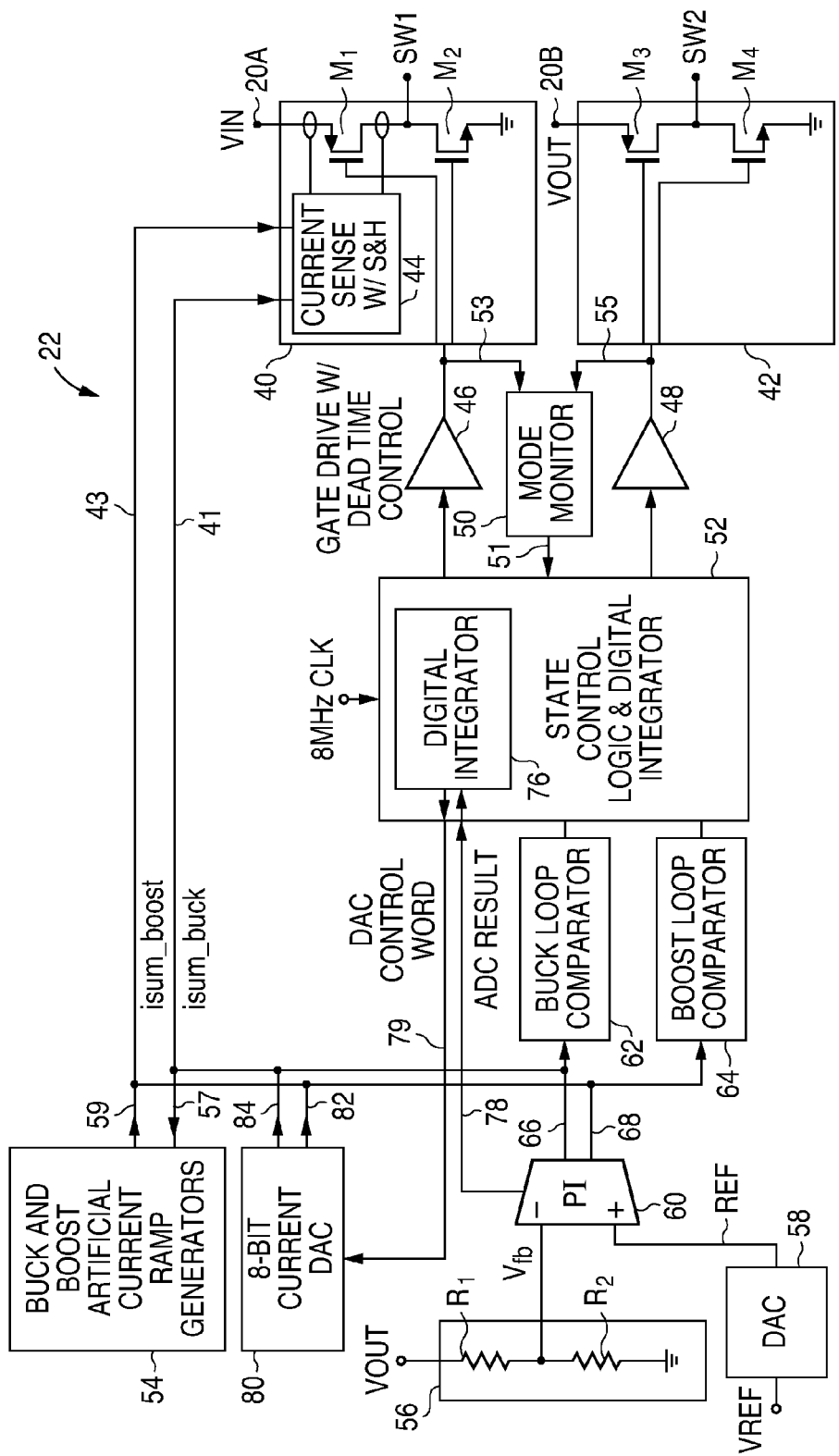
FIG. 2 is a block diagram of a buck or boost DC-DC converter in accordance with one embodiment of the present invention.
Figure 4A:
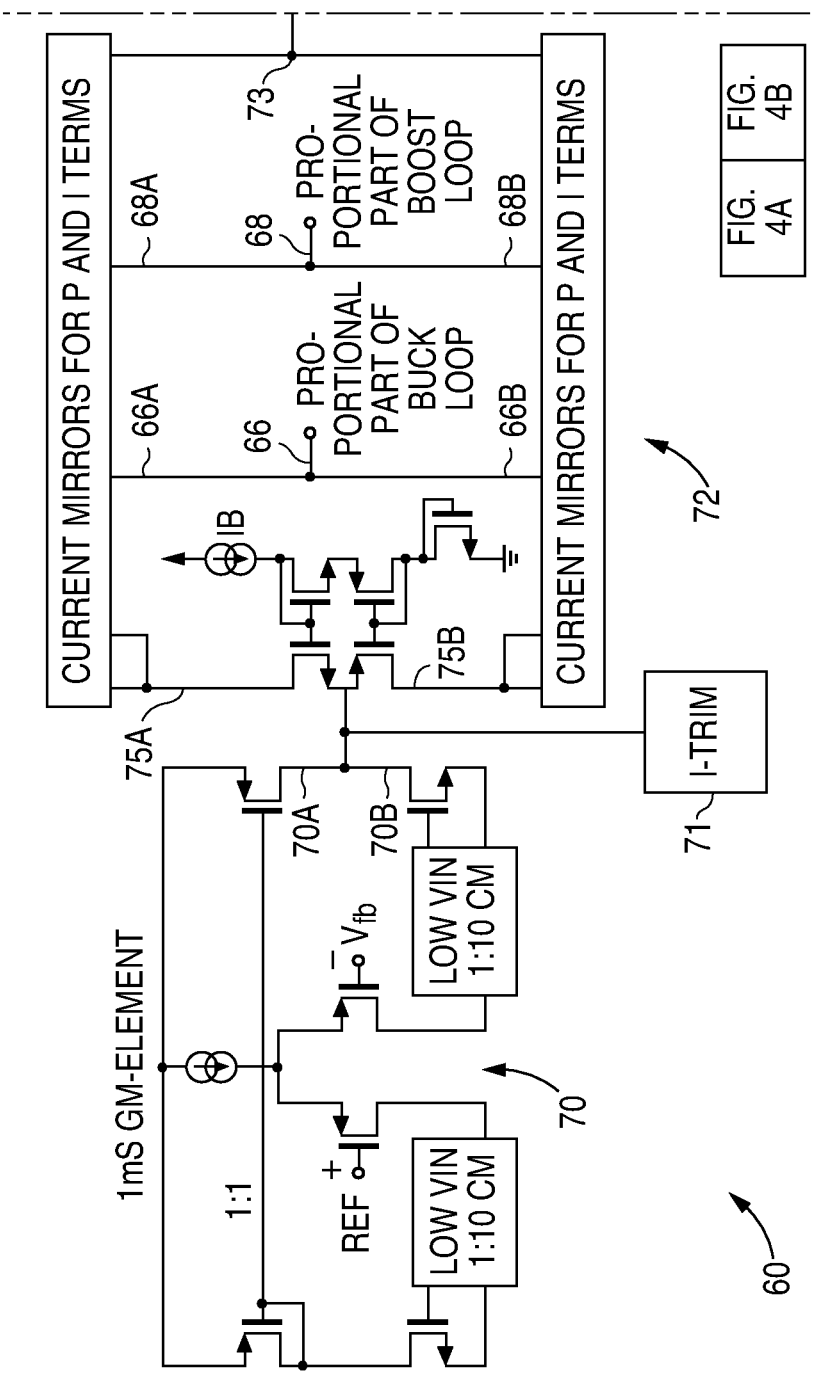
FIG. 4 is a diagram showing additional detail of the PI compensator circuit used in the FIG. 2 DC-DC converter.
Figure 4B:
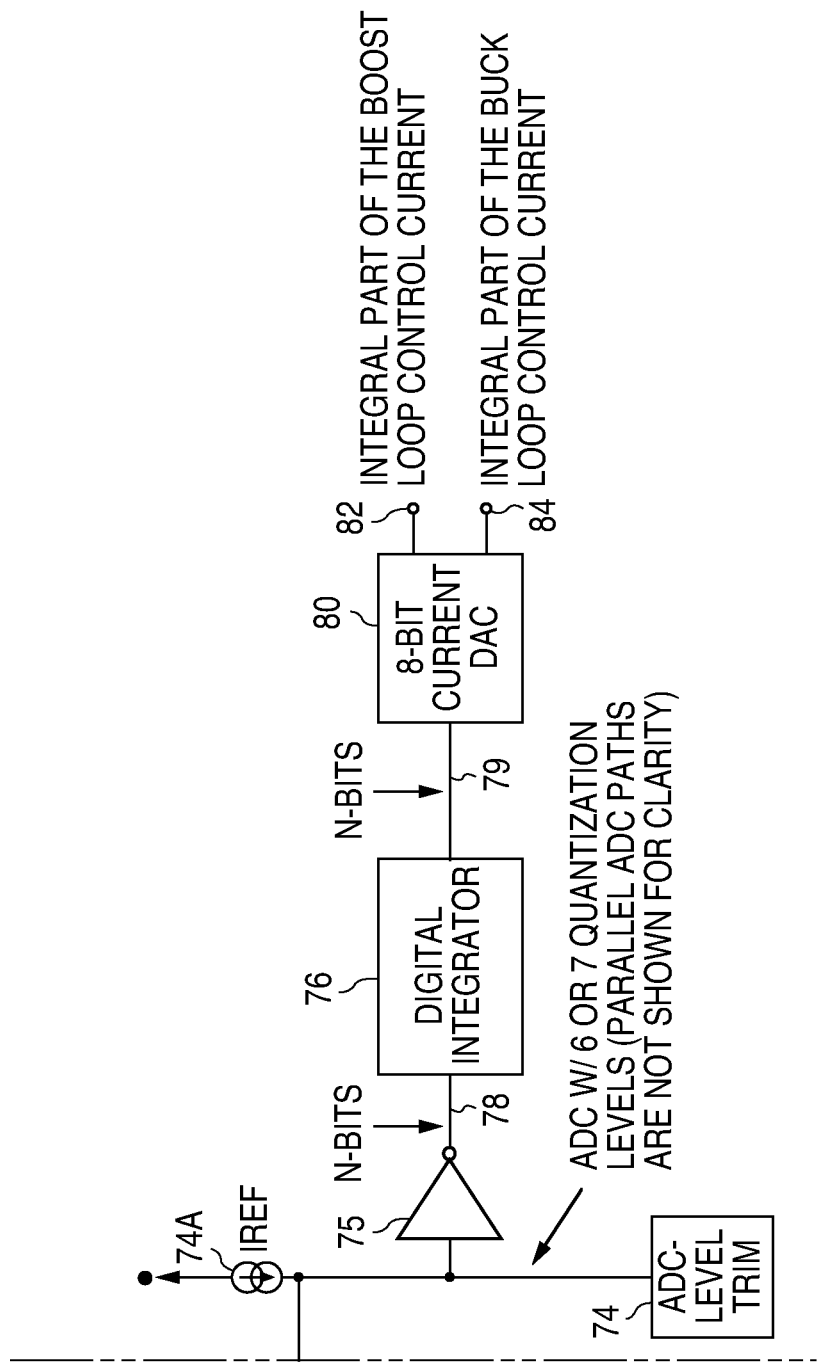

Referring again to the drawings, FIG. 2 is a bock diagram of a DC-DC buck or boost converter 22 in accordance with one embodiment of the present invention. The converter includes a boost control loop and a buck control loop. Each loop utilizes a current mode topology which provides output voltage regulation based upon both the sensed output voltage and the load current. The buck loop incorporates peak controlled current topology and the boost loop relies upon valley current topology. The boost and buck control loops operate concurrently as will be explained.

Figure 1:
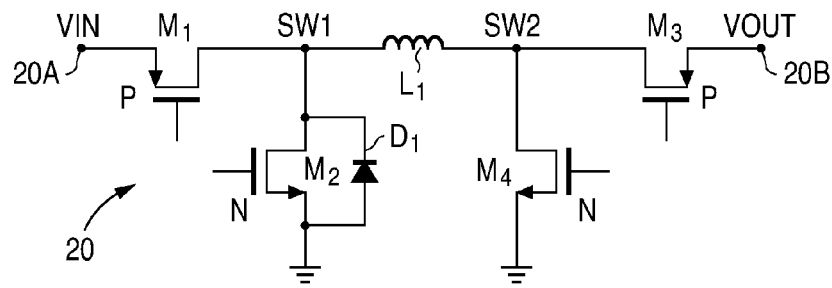
FIG. 1 is a diagram depicting a prior art switching circuit for use in a DC-DC converter, including four transistor switches and an associated inductor.

The converter 22 includes switching transistors M1, M2, M3 and M4 connected as depicted in FIG. 1. An inductor (not depicted) is to be connected between switching nodes SW1 and SW2. A gate drive circuit 42 controls the state of M1 and M2 of switch block 40, driving the transistor in an anti-phase mode, with there being a dead time to ensure that both transistors are never ON at the same time so as to short Vin to ground. A similar gate drive circuit 48 functions to drive transistors M3 and M4 of switch block 42.

A buck loop comparator 62 operates by sensing the state of a buck current summing node which is connected to the various components of the buck control loop. The various components connected to the summing node either source or sink currents, with the comparator 62 being configured to trip when the current on the node is essentially zero. Increased operating speeds can be achieved since it is not necessary to charge or discharge line capacitances as is required with voltage based buses. The current node is maintained at about one half the power supply voltage (VDD/2) so that the various current driving and sensing circuit components connected to the node are operating in their respective active regions.

A boost loop comparator 64 operates by sensing the state of a boost current summing node which is connected to the various components of the boost control loop. Again, those components either source or sink currents, with comparator 64 being configured to trip when the current on the node is essentially zero.

The output voltage Vout is fed back to a voltage divider 56 made up of resistors R1 and R2 in order to provide a feed back voltage Vfb. Voltage Vfb is connected to the (+) input of the front end 60 of a PI compensator circuit. The (−) input to the PI compensator circuit is a reference voltage provided by a DAC circuit 58. A digital input to DAC 58 allows the voltage Ref to be adjusted in accordance with the desired (target) regulated output voltage Vout. As is well known, a PI compensator is a type of feedback controller that provides an error value having a proportional term (P term) and an integral term (I term). As will be describe in greater detail, the P term for buck operation is provided to the current summing buck node as indicated by line 66, with the current on line 66 either sourcing or sinking current on the node. The P term for boost operation is provided by current on line 68, with the line either sourcing or sinking current on the boost current summing node. The PI compensator I term for buck operation is produced by a DAC circuit 80, with the current output of the DAC being provided to the buck current summing node by way of line 84. The I term of boost operation is also DAC circuit 80, with the boost I term being provided to the boost current summing node by line 82.

As previously noted, the buck and boost control loops each receive a P term input from the compensator input section 60 on respective lines 66 and 68. The values of the two P terms are the same for both control loops so that the loops share a common P term. As will be described, the P terms are preferably generated using analog circuitry which is generally faster than digital circuitry configured for the same purpose. As also previously noted, the buck and boost control loops each receive a compensator I term input from DAC 80 on respective lines 84 and 82. The values of these two I terms are also the same for both control loops so that the loops share a common I term. The I terms are produced using a digital integrator which allows a much larger programming range than could be accomplished using a pure analog implementation. In addition, no external integration capacitor is needed with digital integration nor is a large integrated integration capacitor needed, with such capacitors requiring a large die area.

Inductor L current sensing needed for current mode operation is accomplished using a current sensor circuit 44 connected across transistor M1. Sensor 44 sinks current on line 43 for the boost current summing node which is indicative of the inductor L current. Sensor 44 further sinks current on line 41 for the buck summing node which is also indicative of inductor current. The sensed inductor current is the same for both lines 41 and 43. A mode control circuit 50 is connected to indirectly sense the load current and to switch from pulse width modulation (PWM) at relatively low average load currents to pulse frequency modulation (PFM) to increase operating efficiency. As will be described in greater detail, the indirect load current sensing is carried out by monitoring, among other things, the signals from gate drive circuits 46 and 48 used to drive transistors M2 and M4. For normal load currents, PWM is used.

A ramp generator 54 provides an artificial current ramp for buck operation by sinking current on line 57 from the buck current summing node. Generator 54 also provides an artificial current ramp for boost operation by sourcing current to the boost current summing node by way of line 59. The buck current ramp changes linearly during a switching period, with the boost current ramp changing linearly, with a slope opposite to the buck current ramp, during a switching period. As is well known, the use of artificial current ramps, sometimes also referred to as slope compensation, is used to improve stability in current mode converters. As will be described, in both cases the respective artificial current ramp outputs are combined with the respective compensator P and I outputs to produce a combined signal which is then compared to the inductor L current IL for peak and valley current control. The buck and boost artificial current ramps are implemented so they begin each switching period spaced apart from one another so that the sensed inductor current signal will fall intermediate the two ramps at the beginning of the switching period. The opposite slope ramps eventually cross one another later in the switching period. Thus, regardless of the inductor current IL level during a given period, the current signal will eventually match at least one of the ramps thereby causing the associated buck and/or boost comparator to be triggered thereby insuring stable operation under all operating conditions.

Block 52 provides various state control logic functions that will be described in connection with the overall operation of the converter. In addition, block 52 includes a digital integrator 76 used for producing the integral I term of the PI compensator, with the digital output of the integrator (DAC control word) being provided to current DAC 80 which, as previously noted, produces the current outputs for the I term for the buck and boost summing nodes.

Figure 7:
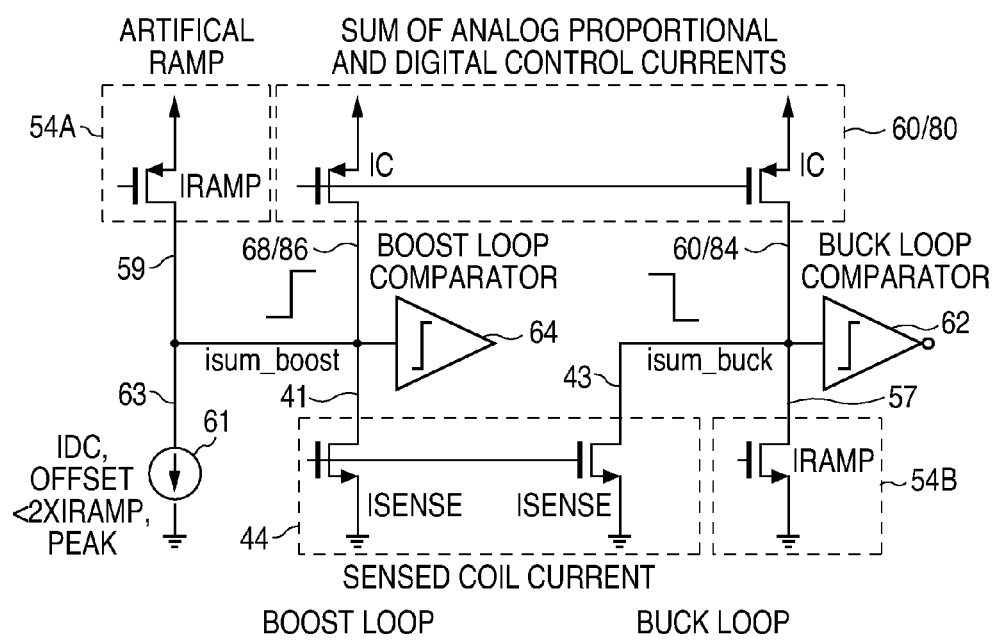
FIG. 7 is a simplified diagram showing the buck current summing node and the boost current summing node of the subject DC-DC converter along with the various circuit elements connected to the two summing nodes.

FIG. 7 shows in a more simplified manner the boost and buck loop summing current nodes and the components connected to the nodes. Once again, the state of boost loop current summing node is sensed by comparator 64, with the summing node being further connected to the boost ramp generator 54A, the inductor current sensing circuit 44. In addition, the PI compensator P and I current terms provided by the compensator input stage 69 and DAC 80 are also connected to the boost loop summing node. Note that the boost current ramp is provided with a fixed offset current produced by current source 61 by way of line 63 to shift the boost current ramp with respect to buck current ramp. As will be explained, the offset forces the two opposite polarity current ramps as originally produced to overlap one another during each switching period.

Figure 6:
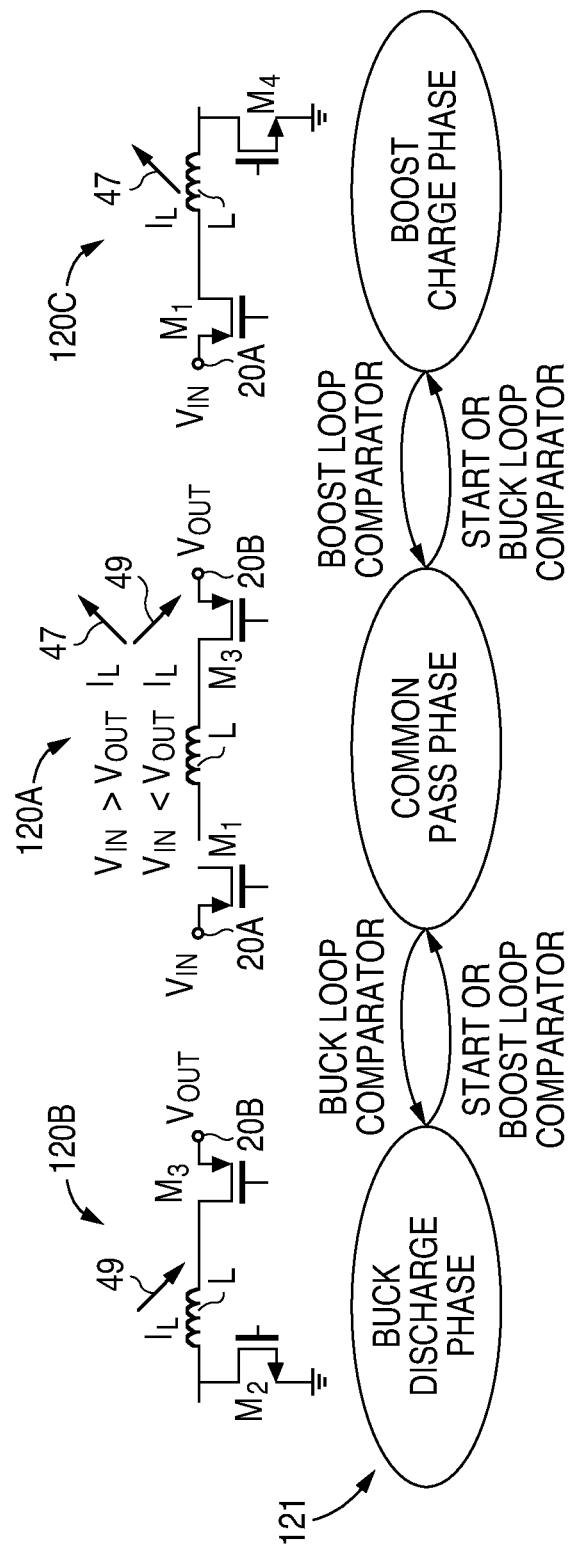
FIG. 6 are circuit diagrams of illustrating the three operating phases of the switching circuit of the FIG. 2 converter, including the buck discharge phase, the boost discharge phase and the pass phase along with a state diagram.

FIG. 6 shows the three possible switch configurations for PWM operation. A first configuration, the common pass phase 120A, switches M1 and M3 are ON and M2 and M4 are OFF. Thus, the inductor L is connected between the input terminal 20A where Vin is present and output terminal 20B where Vout is present. Depending upon the relative magnitudes of Vin and Vout, the inductor current IL can be in either direction as indicated by arrows 47 and 49. A second configuration, the buck discharge phase 120B, switches M2 and M3 are ON and M1 and M4 are OFF. Since one terminal of the inductor L is grounded by M2 and the other terminal is at Vout, the inductor current IL will discharge to the output capacitor and load as indicated by arrow 49. The boost discharge phase 120C is the third configuration where M1 and M4 are ON and M2 and M3 are OFF. Since Vin is connected to one terminal of inductor L and the other terminal is grounded, the inductor IL will be charged, with the inductor current increasing as indicated by arrow 47.

Overall operation of the subject buck or boost converter 22 will now be described primarily by reference to the timing diagram of FIG. 3 and the flow chart of FIG. 5. Note also that FIG. 6 further includes a state diagram 121 the supplements the FIG. 5 flow chart. The upper portion of the FIG. 3 timing diagram illustrates all of the current components in each of the buck and boost loop current summing nodes. By way of example, during the first switching period depicted in FIG. 3 (the pure buck phase), the sensed inductor current IL is represented by line 104A. As previously explained, each control loop is provided with a separate but equal currents representing the inductor current IL. As also explained, both control loops operate in parallel at all times. Five different switching periods are depicted in FIG. 3, where, going from left to right, the value of Vin starts out larger than Vout, with Vin decreasing relative to Vout until the two voltages are essentially equal and then decreasing further until Vin is less than Vout. As will be explained, the transition from a buck operating mode to a boost operating mode is carried out very smoothly with no significant disturbance in the output voltage Vout. Similarly, the transition in the opposite direction, right to left, from boost to buck operating modes is also carrier out smoothly.

The duration of each switching period is fixed, with the converter operating at a fixed frequency except (except for PFM operation). During each switching period, the sensed inductor current will eventually reach a point where one or both of the buck/boost comparators are tripped. At that point, the value of the sensed current will be held through the remainder of the switching period by a sample and hold circuit. By way of example, during the first switching period of FIG. 3, the inductor sense current 104A will intercept ramp 108A as indicated by arrow 119A. The value of the sense current will be held during the remainder of the period as indicated by waveform 104B. The actual sensed inductor current will continue to change as represented by dotted line waveform 106A. The buck artificial current ramp and the compensator I and P outputs are combined to produce current waveform 108A, referred to herein as the buck+comp ramp waveform. Note that the compensator contribution to waveform 108A operates to add or subtract a DC current component to the buck artificial current ramp. Waveform 108A is depicted in an inverted form for purposes of visual clarity. Thus, when that waveform 108A crosses the inductor current waveform 104A, the sum of the currents on the buck current summing node is actually zero (and not the sum of two positive currents). The boost artificial current ramp combined with the compensator I and P outputs, indicated by waveform 110A, is shown inverted for the same reason. Once again, the compensator contribution is to add or subtract a DC current component to the boost artificial current ramp. Note that the FIG. 3 timing diagram includes a legend 105 illustrating the appropriate operating phase from the three phases 120A, 120B and 120C of FIG. 6.

Figure 5:
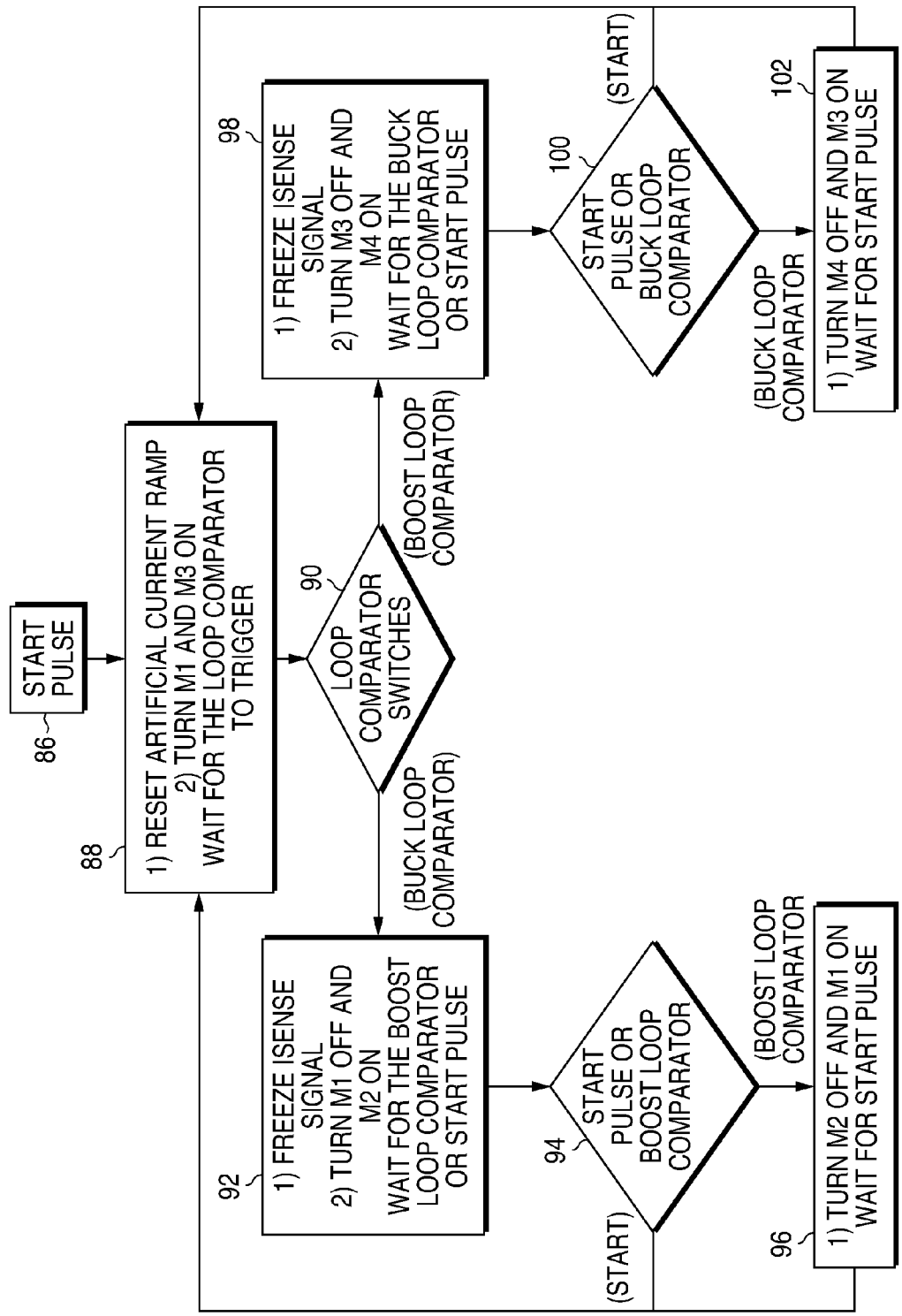
FIG. 5 is a flow chart illustrating part of the operation of the FIG. 2 DC-DC converter.

Referring now to the flow chart of FIG. 5, each switching period commences with a start pulse (block 86) such as pulse 112A of the first switching period of the FIG. 3 timing diagram. The artificial buck and boost current ramps are reset (block 86) at the beginning of each period. Thus, both the boost+comp ramp 108A and the buck+comp ramp waveform 110A will start at minimum values. (Since one ramp is added to the compensator current and the other is subtracted, the waveforms 108A and 110A in the FIG. 3 diagram only appear to be set to opposite values.) Since a maximum value (although it is depicted as a minimum value) as indicated by the inverted waveforms 108A and 110A of FIG. 3. Each switching period also starts in the pass phase as indicated by the legend 105 of FIG. 3. As shown by diagram 120A of FIG. 6, for the pass phase inductor L is connected between the input and output terminals 20A and 20B by respective ON transistors M1 and M3. The relative magnitudes of Vin and Vout during the pass phase determine the direction and magnitude of the inductor current IL as shown in circuit 120A by arrows 47 and 49. Note that the only time the inductor L current IL is sensed is during this pass phase, with the current sensor 44 (FIG. 2) being operative only when M1 is ON.

At the beginning of the pass phase when Vout is greater than Vin, the inductor current IL will begin to flow so as to charge inductor L as illustrated by waveform 104A of the FIG. 3 timing diagram. As previously noted, the sensed current IL (waveform 104A) will always commence intermediate the two opposite slope reset boost+comp and buck+comp ramp waveforms 108A and 110A and will eventually intercept one or the other or both of the waveforms 108A and 110A. This condition indicates that the associated buck/boost current summing node is at the zero current level so that one of the buck/boost current comparators 62/64 will trip (elements 88 and 90 of the flow chart).

For the conditions reflected in the first switching period of the FIG. 3 diagram, the rising inductor current IL, as reflected by the inductor current waveform 104A, will intercept the buck ramp+comp waveform 108A indicating that the two currents on the buck current summing node are equal and opposite. The buck comparator 62 then trips as indicated by waveform 114A, with this action causing the peak current level indicated by arrow 119A to be sampled and held for the remaining duration of the switching period as indicated by waveform 104B (element 92 of FIG. 5 flow chart). Waveform 106A shows the actual inductor current IL, as opposed to the held current value 104A during this discharge period. In further response to the comparator tripping, switch M1 is turned OFF and switch M2 is turned ON, with switch M3 remaining on. As indicated by legend 105, the converter is now in the buck discharge phase as shown by circuit 120B of FIG. 6.

The peak current level 104B is sufficiently high so that it does not intersect the boost+comp waveform 110A during the remainder of the switching period. Thus, the converter will remain in the buck discharge phase throughout the remainder of the switching period, with the sequence returning to block 88 of the FIG. 5 flow chart when the next start pulse is received. This sequence will be repeated if the relationship between Vin and Vout and the load current remain substantially unchanged. This state is referred to in the FIG. 3 timing diagram as the pure buck mode.

Assume, however, that Vin has dropped in value, perhaps due to discharge of a battery supplying Vin, but with Vin still being greater than Vout. As indicated by block 88 of the flow chart, the artificial buck and boost current ramps are again reset, with the converter switching from the buck discharge phase 120B (M2 and M3 ON) to the pass phase 120A as is done at the beginning of each switching period. Thus, M3 is left ON, M2 is turned OFF and M1 is turned ON so that M1 and M3 are ON. As can be seen in the FIG. 3 diagram, the inductor current IL waveform 104C begins to increase, but with a significantly shallower slope than before. After a relatively large period of time, the inductor current waveform 104C intercepts the buck+comp ramp waveform 108B as indicated by arrow 119B causing the buck comparator to trip (elements 90 and 92 of flow chart) as can be seen from waveform 114B. Once again, the peak inductor current level is sampled and held as indicated by waveform 104D throughout the remainder of the switching period. The buck discharge phase is then entered where M1 is turned OFF and M2 is turned ON. As can be seen by the actual inductor current waveform 106B, the inductor begins to discharge. Soon thereafter, the held peak inductor current 104D, which is present on both the buck and boost control loops as separate signals, will intercept the boost+comp ramp waveform 1106 of the boost control loop causing the boost comparator to trip as indicated by waveform 116B. The triggering of the boost comparator 64 while in the buck discharge phase 120B will cause the buck discharge phase to be terminated before the end of the switching period. The remainder of the switching period will be carried out in the pass phase 120A with M2 being turned OFF and M1 being turned ON so that both M1 and M3 are ON (element 96 of the FIG. 5 flow chart. Thus, inductor L will continue to be discharged since Vin is still greater than Vout until the end of the period. As can be seen, depending upon the slope of the sensed current waveform 104C, the duration of the buck discharge phase can be reduced to zero.

As will be explained, when the input Vin and output Vout are essentially equal, the converter enters a transition mode where the pass phase 120A exists throughout the entire switching period. Since the converter was already in the pass phase with slight inductor charging at the end of the close-to-transition mode, entry into the pass phase with slight or no inductor charging at the beginning of the transition mode can be readily accomplished without creating any disturbance. In order to ensure that the buck discharge phase is terminated by the triggering of the boost loop comparator, it is important that the peak inductor current be held as indicated by waveform 104D, since the actual sensed inductor current waveform 106B would not intersect the boost+comp ramp waveform 1106, as can be seen in FIG. 3.

Assuming that the value of Vin becomes even more closer than Vout, the slope of the sensed inductor current waveform 104C becomes even shallower. This means that the buck loop comparator 62 will trigger later and the boost loop comparator 64 will trigger sooner thereby shortening the boost charge phase period depicted in the second (close-to-transition mode) switching period of FIG. 3. As previously noted, the two ramp waveforms are reset at the beginning of each switching period. As will be described in connection with the ramp generating circuit of FIG. 10, the circuit operates to readjust the boost+comp ramp waveform relative to the buck+comp ramp waveform by adjusting the boost artificial ramp offset. This includes sensing the peak (or valley) inductor current during the previous switching period and setting the intersection point of the two ramp waveforms at the beginning of the switching period so that a substantially horizontal sense current waveform 104E (FIG. 3) will cross the two ramp waveforms 108C and 110C at the intersection of the two ramp waveforms as indicated by arrow 119C. The two ramps cross before the end of each switching period to ensure that there are no dead control zones when Vin is operating near Vout. As soon as the buck loop comparator 62 triggers the beginning of a buck discharge phase (elements 90 and 92) the boost loop comparator 64 will end the buck discharge phase (elements 94 and 96) so that no buck discharge phase is ever entered. In the event the boost loop comparator 64 happens to be triggered first (elements 90 and 98), the boost charge phase will proceed to start but will then be stopped by the triggering of the buck loop comparator (elements 100 and 102). In either case, this causes the converter to be in the transition mode shown in FIG. 3 where the converter remains in the pass phase 120A throughout the entire switching period.

Assuming that Vin drops slightly below Vout, the slope of the sensed inductor current will change polarity and will become somewhat negative as indicated by waveform 104G. Once again, the switching period will begin in the pass phase with M1 and M3 ON (element 88 of the FIG. 5 flow chart). Since Vout is somewhat greater than Vin, the inductor will proceed to be discharged as indicated by arrow 49 of FIG. 120A. The current waveform 104G will first eventually intersect the boost+comp ramp waveform 110C as indicated by arrow 119D. This will cause the boost loop comparator 64 to trip (element 90) which will cause the sensed inductor current to be sampled and held during the remainder of the switching period as indicated by waveform 104H. This will further cause the converter to enter a boost charge phase depicted by 120C of FIG. 6 (element 98). Entry into this phase is carried out by turning M3 OFF and turning M4 ON so that the inductor L is connected between Vin and ground. As indicated by the actual sensed inductor current waveform 106D, the inductor will begin to charge during this boost charge phase. Very soon, the held sensed inductor current 104H will intersect the buck+comp ramp waveform 108D thereby triggering the buck loop comparator 62 as indicated by waveform 114D (element 100). The converter will then be switched to the pass phase by turning M4 OFF and turning M3 ON thereby continuing the charging of the inductor (element 102). The converter will remain in the pass phase throughout the remainder of the switching period until the next start pulse. This is a second close-to-transition mode where it is apparent that the boost charge phase could be reduced to zero duration, depending upon the difference between Vout and Vin. Since the converter was in the pass phase with some or no inductor discharging during the transition mode, entry into the pass phase of the second close-to-transition mode with only small inductor charging is readily carried out with no disturbances.

If the value of Vin continues to drop, the converter will enter the pure boost mode as shown in FIG. 3. Once again, every switching period begins with a pass phase where, in this case, the inductor is discharged into the filter capacitor and load as indicated by waveform 104I. Given the relatively large difference between Vin and Vout, the negative slope of the sensed current waveform is large so that the boost+comp current ramp waveform 110E is intercepted rather early in the switching period. This will cause the boost loop comparator 64 to trip (element 90) which will result in the sensed inductor current being sampled and held throughout the remainder of the switching period (element 98). In addition, the converter will be switched out of the pass phase and into the boost charge phase where the inductor will proceed to be charged as indicated by the sensed actual inductor current waveform 106E. Given the magnitude of the held inductor current as indicated by waveform 104J, the waveform never intercepts the buck+comp ramp waveform 108E during the switching period. Thus, the buck loop comparator never trips so that the converter remains in the boost charge phase for the remainder of the switching period. The converter will remain in this pure boost mode as long as Vout is significantly greater than Vin.

Note that the above-described sequence operates in the reverse direction. Thus, if the battery providing Vin is recharging by way of example, Vin will begin to increase. The converter will exit the pure boost mode (elements 90, 98, 100 and 88) shown in FIG. 3 and proceed to the close-to-transition mode (elements 90, 98, 100, 102 and 88) when the buck comparator triggers. Eventually the converter will pass through the transition mode to the close-to-transition mode (elements 90, 92, 94 and 96 and 88) and finally to the pure buck mode (90, 92, 94 and 88).

The details of the PI compensator will now be described. As is well known, PI compensators provide a P output which is the proportional term of the compensator. The proportional term is simply the input error signal multiplied by gain element. The proportional term can be tuned by adjusting the value of gain element. If the gain is too high, the system may become unstable and if too low, the control action may not be adequate to respond to a large input error. The integral term is proportional to both the magnitude of the error and the duration of the error. One function of the integral term is the elimination of residual steady state errors that accumulate when only a proportional term is used. The integral term can also be tuned.

FIG. 11 depicts a general implementation of a fully analog PI compensator having two parallel branches, each utilizes transconductance amplifier elements to that the current outputs are summed at the compensator output. The P term is generated by multiplying the input error signal Ve by gm2 to produce current Ip, with gm2 being the transconductance of amplifier 124. The I term is generated by multiplying the input error signal Ve by gm1/Cs to produce Ii where gm1 is the transconductance of amplifier 122, C is the value of the integrating capacitor 126. (Buffer 128 is a unity gain current amplifier.) The current output Iout of the compensator is simply Ii+Ip. The transfer function of the FIG. 11 compensator is thus as follows:

$$Iout/Ve = gm1(1+sCgm2/gm1)/sC \qquad \text{Eq. (3)}$$

As indicated by Eq. (1), the poles and zeros of the transfer function can be easily manipulated by changing the ratio of the gain of the two gm elements.

The FIG. 11 PI compensator has an analog front end to produce the P term followed by digital integration circuitry to produce the I term. Among other things, the use of a digital integrator avoids the need for any external capacitor. The PI compensator provides P and I terms to both the boost control loop and the buck control loop. The two control loops share the same P and I terms. As previously noted, the boost and buck control loops operate in parallel and require separate (but equal) current outputs from the compensator. The front end 60 of the PI compensator of FIG. 2 includes a high gain transconductance amplifier common 70 common to both the P and I terms. Amplifier 70 includes a differential transistor input stage, with the (+) input receiving the reference voltage input Ref which determines the regulated output voltage level and with the (−) input receiving the voltage feedback signal Vfb indicative of the actual output voltage, with the difference representing an error value. The amplifier includes current mirror circuitry which increases the differential current flowing in the input stage by a factor of 10. Depending upon the polarity of the amplifier inputs, the amplifier either sources current on output line 70A or sinks current on output line 70B. Current trim circuitry 71 is connected to the amplifier output to eliminate any amplifier offsets. The current output of amplifier 70 is connected to a current input of an operational current amplifier stage 75. Stage 75 includes three current outputs provided by current mirror circuitry. The P term current output for the buck control loop is provided at node 66, with current either being sourced to the node by line 66A or sunk from the node on line 66B. A similar current output is provided on node 68 which functions as the P term for the boost control loop. Current is sourced to the node on line 68A and sunk from the node on line 68B. As previously noted, the current P term outputs are the same for both the boost and buck control loops.

Amplifier 72 further provides a current output on node 73 to be used to produce the buck and boost I term. The gain at node 73 is fixed whereas the gain at outputs 66/68 are program adjusted. The current level is sensed by a bank of current comparators represented by element 76 to convert the analog current level into digital form. There are N (typically 7) comparators set to trip at differing levels to provide N digital outputs represented by single line 78. Those N number of lines 78 form the output of the PI front end 60 (FIG. 2) which extend to the digital integrator 76 located in block 52 of FIG. 2. Each of the N current steps translates into a voltage change at Vout, by way of example, of +96 mV, +48 mV, +12 mV, 0 mV, −12 mV, −48 mv and −96 mV. Assuming that divider 56 of divides Vout by a factor of 8, these voltages, when referred to the feedback voltage Vfb at the input of the compensator 60, are each divided by 8.

The N number of bits applied to the digital integrator for one switching period are mathematically added to the N number of bit from the previous switching period using a digital counter to provide N+1 bits representing an integrated value. This 8 bit integrated value is forwarded to the current DAC 80 by way of lines 79 in the form of a DAC control word. DAC 80 provides the final compensator I term used in both the boost control loop by way of line 82 and the buck control loop by way of line 84. Note that the I term, rather than the P term, is the primary compensator term for the two control loops.

The PI compensator is programmable to allow transient response tuning using the external regulator components specified by the end user. The preferred approach is the Ziegler-Nichols closed loop tuning method which is well known and simple.

Further details regarding the construction and operation of the circuit 54 for producing the boost and buck artificial current ramps are depicted in the circuit of FIG. 10. A first current source 130A charges a capacitor 136 through an N type transistor 132A thereby producing an increasing ramp voltage which is applied across a resistor 138. A fixed current from source 130B is provided to resistor 138 by way of another N type transistor 132B. Thus, a current 137 is drawn through P type transistor 140 equal to the ramp current flow through resistor 138 less the fixed offset current 130B. The offset ramp current through 140 is mirrored in transistors 142 and 146, with transistor 146 providing the artificial boost current ramp at node 59. The current through transistor 142 flows through transistor 144 which forms the input transistor of a current mirror circuit. Transistor 148 is the output of the current mirror circuit, with the current in transistor 148 being the artificial buck current ramp at node 51.

The two current ramps are of opposite polarity. In order for the two ramps to overlap as depicted in the FIG. 3 timing diagram, a DC offset current on line 63 is subtracted from the boost current ramp. The point at which the two ramps intersect is controlled by the magnitude of the offset current. This offset current is produced by transistors 150, 152 and 154. During the switching period, switch S1 is open and switch S2 is closed, with a sample capacitor C1 holding a voltage which determines the magnitude of the offset current. As previously noted, at the beginning of each switching period, the current ramps are reset by discharging capacitor 136. Just prior to this point, the peak boost ramp current is sampled closing switch S1 so as to charge capacitor C1 to the voltage corresponding to the peak boost ramp current, switch S2 is opened when the current ramps are reset so as to turn the offset current off. Switch S1 is kept off when the ramps increase. Just before the end of the switching period, switch S2 is opened and S1 is closed momentarily to update the new artificial ramp peak voltage held on C1 to control the magnitude of the offset current on line 63. Note that C1 is larger than the gate-source capacitance of transistor 154 so that C1 can also provide a low pass filtering function. The offset current is typically somewhat less than twice the peak current.

Figure 8:
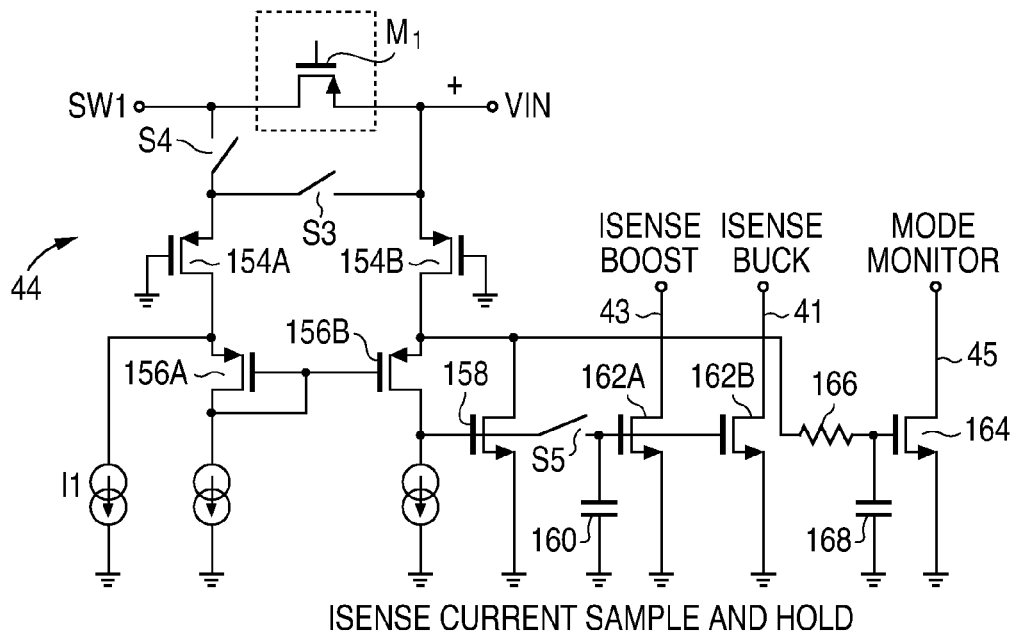
FIG. 8 is a simplified diagram of the inductor current sensing circuit used in the subject DC-DC converter.
Figure 9:
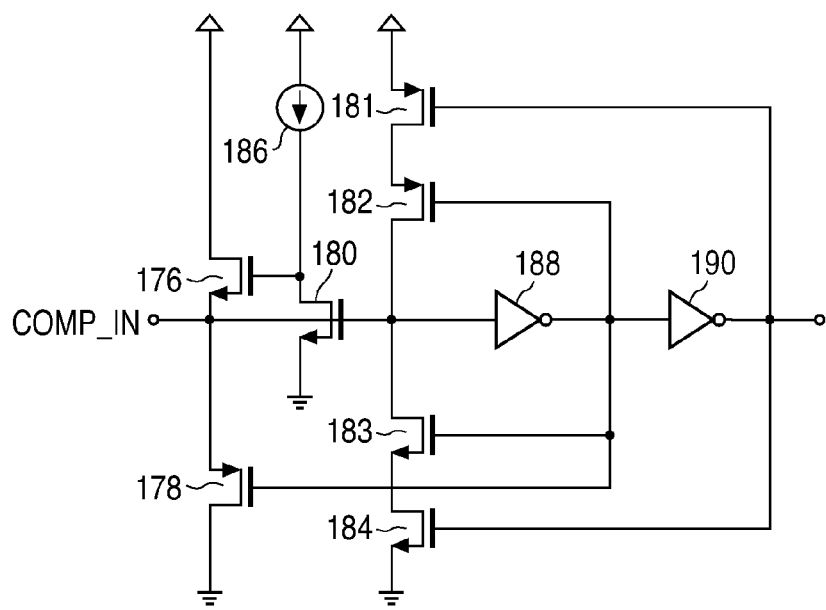
FIG. 9 is a simplified diagram of a current comparator for use in the buck and boost control loops.

Details of the inductor current sense circuitry 44 are shown in FIG. 8. As previously noted, the sense circuitry is connected across transistor M1 and operates in the pass phase 120A (FIG. 6) when M1 is conducting the inductor current. Inspection of the balanced transistor input stage indicates that current flow through transistors 154A, 156A and 156B remains relatively fixed. When sense circuit 44 is not monitoring the inductor current, switch S4 is open and switch S3 is closed. In this state the transistor input stage is balanced so that transistor 158 will conduct a current equal to I1. Current I1 thus represents zero inductor current flow.

Inductor current sensing commences when M1 is turned ON in one of the pass phases. Just prior to that, switch S3 is opened and switch S4 is closed so that the voltage dropped across M1 due to inductor current flow is also dropped across the input transistors 154A and 154B. In addition, switch S5 is closed. When the inductor current proceeds to either increase or decrease, the voltage across M1 will either increase or decrease. Assuming that the inductor is being charged as in the pure buck mode (FIG. 3), the voltage on the source terminal of transistor 154B will increase in value relative to the voltage on the source terminal of transistor 154A. This increasing imbalance will cause the current flow in transistor 154B to increase, with this increase in current flowing through transistor 158 representing an increase in inductor current. The increase in transistor 159 current will cause an increase in the gate-source voltage of transistor 158 along with that of boost and buck output transistors 162A and 162B. Thus, both the boost and buck outputs on lines 41 and 43 sink a current indicative of the sensed inductor current. Assuming that the inductor current is being discharged as in the pure boost mode, the sensed voltage across M1 will start out high at the beginning of the switching period and will drop as the inductor is discharged. This will also result in corresponding changes in the sensed inductor current signals provided by lines 41 and 43.

The FIG. 8 current sensing circuit also provides an output to the mode monitor circuit 50 (FIG. 2) used to determine whether the average load current is sufficiently low to indicate that PFM should be used. The current signal provided by transistor 154B is feed to a low pass filter made up of resistor 166 and capacitor 168, with the filtered voltage being provided to the gate of transistor 164. Thus, transistor 164 sinks a current on line 45 indicative of the average load current.

FIG. 12 is a simplified diagram of the mode monitor circuit 50. The circuit calculates an average load current estimate using the current sense signal on line 45 and the buck and boost duty cycles which relates to the voltage conversion ratio for each of the boost/buck operating modes. The buck duty cycle is determined by the control signal that switches transistor M2 and the boost duty cycle is determined by the control signal that switches transistor M4. The value of current source 172B is typically 0.5 μA and the value of current source 172C is typically 2.0 μA. The output of filter 170B sources current to a current summing node 171, the input of filter 170C sinks current from the node. The current polarity in internally reversed before the mode monitor low pass filter 170A, with filter 168 (FIG. 8) having a much smaller time constant as compared to filter 170A. When the combined currents on node 171 are greater than zero, the input to current comparator 174 sinks some current so that the comparator output is low. In the event the combined currents are less than zero, the load current is sufficiently low to justify switching to the PFM mode. The comparator will then tend to source a current, with this action causing the comparator output to change state.

FIG. 7 shows an exemplary comparator circuit that can be used for both the boost control loop and buck control loop comparators 64 and 62. The input portion operates to clamp the current summing node connected to the comparator input at some mid-level voltage as previously noted so that all of the devices connected to the summing node are operating in an optimum input level. Transistors 176 and 178 provides this clamping function, with transistor 180 and current source 186 operating to bias transistor 176. Among other things, this clamping voltage will cause the input inverting buffer 188 to operate around one threshold voltage so that the buffer input is close to the trip point but not leaking excessively. Feedback from the output of buffer 188 to the gate of transistor 178 operates to bias the buffer input at this midpoint voltage. As will be explained, serial connected transistor 181, 182, 183 and 184 are connected to provide positive feedback when the comparator is transitioning between states to speed up the transition time. When the current on the associated current summing node is too low, the comparator input will be required to source a small current which will cause the input to the first buffer circuit 188 to be slightly pulled down in voltage. This will cause the output of buffer 188 to be slightly high which will cause the output of buffer 190, the comparator output, to be low. In this steady state, N type transistor 183 will be ON but serially connected N type transistor will be OFF. In addition P type transistor 181 will be ON but serially connected P type transistor 182 will be OFF. Thus, no feedback is provided by the four transistor string.

When the current level on the associated current summing node increases toward zero and slightly above zero, there is a slight voltage increase on the input to buffer 188. This will cause the output of buffer 188 to begin to transition to a low state and the output of buffer 190 to transition to a high state. During this transition period, P type transistors 181 and 182 will be momentarily conductive at the same time thereby tending to pull the buffer 188 input high so as to reinforce, and therefore speed up, the converter transition time. At the end of the transition period, the converter (buffer 190) output is high. Feedback is no longer provided by the 181, 182, 183 and 184 transistor string since transistors 181 and 183 are OFF in this final state.

Thus, one embodiment of the present invention has been disclosed. Although this embodiment has been described in some detail, various changes can be made by those skilled in the art without departing from the spirit and scope of the invention as defined by the appended claims.

What is claimed is:

1. A control circuit for controlling a DC-DC converter, with the converter including an inductor and associated switching circuitry, with the switching circuitry including a first transistor switch connected intermediate an input voltage terminal and a first terminal of the inductor, a second transistor switch connected intermediate the first terminal of the inductor and a circuit reference, a third transistor switch connected intermediate a second terminal of the inductor and an output voltage terminal and a fourth transistor switch connected intermediate the second terminal of the inductor and the circuit reference, said control circuit comprising:

a PI compensator having a first input for receiving a voltage feedback signal from the output voltage terminal and a second input for receiving a reference voltage relating to a target regulated voltage level at the output voltage terminal and producing first and second proportional error term output signals and first and second integral error term output signals;

a buck control loop connected to receive the first proportional error term and the first integral error term output signals;

a buck comparator coupled to monitor a state of the buck control loop;

a boost control loop connected to receive the second proportional error term and the second integral error term output signals;

a boost comparator coupled to monitor a state of the boost control loop;

mode control circuitry responsive to the buck and boost comparators and configured to cause the switching circuitry to switch to a pass phase where the first and third transistor switches are ON, a boost phase where the first and fourth transistors are ON and a buck phase where the second and third transistors are ON, with first selected switching periods beginning operation in the pass phase followed, in response to an output of the buck comparator, by operation in the buck phase, and with second selected switching periods beginning operation in the pass phase followed, in response to an output of the boost comparator, by operation in the boost phase.

2. The control circuit of claim 1 wherein the first and second integral error terms are equal error terms.

3. The control circuit of claim 2 wherein the first and second proportional error terms are equal error terms.

4. The control circuit of claim 1 where the PI compensator includes analog amplifier circuitry for producing the first and second proportional error terms.

5. The control circuit of claim 4 where the PI compensator includes digital integration circuitry for producing the first and second integral error terms.

6. The control circuit of claim 1 wherein some of the first selected switching periods include, in response to the output of the boost comparator, operation in the pass phase after the operation in the buck phase and wherein some of the second selected switching periods include, in response to the output of the buck comparator, operation in the pass phase after the operation in the boost phase.

7. The control circuit of claim 1 further including artificial current ramp waveform circuitry configured to produce buck and boost artificial current ramp signals that are of opposite slopes and are of differing magnitudes at a beginning of each switching period and then cross over one another in terms of magnitude later within each switching period and further including inductor current sense circuitry configured to produce at least one current sense signal and wherein the buck control loop is further connected to receive the buck artificial current ramp signal and the at least one current sense signal and wherein the boost control loop is further connected to receive the boost artificial current ramp signal and the at least one current sense signal.

8. The control circuit of claim 7 wherein during the first selected switching periods when the at least one current sense signal matches a first combination of the first proportional and integral error term output signals together with the buck artificial current ramp signal, the buck comparator output causes the switching circuitry to switch from the pass phase to the buck phase and wherein during the second selected switching periods when the at least one current sense signal matches a second combination of the second proportional and integral error term output signals together with the boost artificial current ramp signal, the boost comparator output causes the switching circuitry to switch from the pass phase to the boost phase.

9. The control circuit of claim 8 wherein the inductor current sense circuitry is further configured to produce a first held current signal after the buck comparator output causes the switching circuitry to switch from the pass phase to the buck phase, with the first held current signal being indicative of the inductor current at a point where the switching circuitry switches from the pass phase to the buck phase and is further configured to produce a second held current signal after the boost comparator output causes the switching circuitry to switch from the pass phase to the boost phase, with the second held current signal being indicative of the inductor current at a point when the switching circuitry switches from the pass phase to the boost phase.

10. The control circuit of claim 9 wherein during some of the first selected switching periods when the first held inductor current signal matches the second combination of signals, the boost comparator causes the switching circuitry to switch from the buck phase back to the pass phase and wherein during some of the second selected switching periods when the second held inductor current signal matches the first combination of signals, the buck comparator causes the switching circuitry to switch from the boost phase back to the pass phase.

11. The control circuit of claim 10 wherein operation remains in the pass phase throughout third selected switching periods when a time difference between the boost and buck comparators outputs is sufficiently small.

12. A control circuit for controlling a DC-DC converter, with the converter including an inductor and associated switching circuitry, with the switching circuitry including a first transistor switch connected intermediate an input voltage terminal for receiving an input voltage Vin and a first terminal of the inductor, a second transistor switch connected intermediate the first terminal of the inductor and a circuit reference, a third transistor switch connected intermediate a second terminal of the inductor and an output voltage terminal for producing an output voltage Vout and a fourth transistor switch connected intermediate the second terminal of the inductor and the circuit reference, said control circuit comprising:

operating mode circuitry for controlling the switching circuitry to transition among first, second, third and fourth operating modes depending upon, at least in part, the relative magnitudes of the input voltage Vin and the output voltage Vout, with the switching circuitry operating in the first operating mode when the magnitude of the input voltage Vin exceeds that of the output voltage Vout and operating in the fourth operating mode when the magnitude of the output voltage Vout exceeds that of the input voltage Vin and operates in the second and third operating modes for intermediate differences in the relative magnitudes of the input and output voltage Vin and Vout;

wherein during the first operating mode, the switching periods begin in a pass phase where the first and third transistor switches are ON and then switches to a buck phase during a remainder of the switching period where the second and third transistor switches are ON;

wherein during the second operating mode, the switching periods begin in the pass phase, switches to the buck phase and then switches back to the pass phase during a remainder of the switching period;

wherein during the third operating mode, the switching period begins in the pass phase, switches to a boost phase where the first and fourth transistors are ON and then switches back to the pass phase for the remainder of the switching period; and wherein during the fourth operating mode, the switching period begins in the pass phase and switches to the boost phase for the remainder of the switching period.

13. The control circuit of claim 12 wherein the operating mode circuitry operates to shorten a duration of the buck phase in the second operating mode and to shorten a duration of the boost phase in the third operating mode in response to a reduced difference in the magnitudes of the input and output voltages Vin and Vout.

14. The control circuit of claim 13 wherein the operating mode circuitry further controls the switching circuitry to transition to a fourth operating mode in response to a further reduced difference in the magnitudes of the input and output voltage Vin and Vout, wherein during the fourth operating mode the switching circuitry remains in the pass phase throughout the entire switching period.

15. The control circuit of claim 14 wherein the switching circuitry is also controlled to transition among the first, second, third and fourth operating modes depending, at least in part, upon a converter load current.

16. The control circuit of claim 15 further including:
a buck control loop coupled to receive a first error signal indicative of a difference between an actual output voltage Vout level and a target regulated voltage level;
a buck comparator coupled to monitor a state of the buck control loop;
a boost control loop coupled to receive a second error signal indicative of a difference between an actual output voltage Vout level and a target regulated voltage level;
a boost comparator coupled to monitor a state of the boost control loop;
wherein a transition from the pass phase to the buck phase in the first and second operating modes is in response to the buck comparator and a transition from the buck phase back to the pass phase in the second operating mode is in response to the boost comparator; and
wherein a transition from the pass phase to the boost phase in the third and fourth operating modes is in response to the boost comparator and a transition from the boost phase back to the pass phase in the third operating mode is in response to the buck comparator.

17. A control circuit for controlling a DC-DC converter, with the converter including an inductor and associated switching circuitry, with the switching circuitry including a first transistor switch connected intermediate an input voltage terminal and a first terminal of the inductor, a second transistor switch connected intermediate the first terminal of the inductor and a circuit reference, a third transistor switch connected intermediate a second terminal of the inductor and an output voltage terminal and a fourth transistor switch connected intermediate the second terminal of the inductor and the circuit reference, said control circuit comprising:
an error signal generation circuit configure to produce at least one error signal indicated of a difference between an actual output voltage Vout level and a target regulated voltage level;
a buck control loop connected to receive the at least one error signal;
a buck comparator coupled to monitor a state of the buck control loop;
a boost control loop connected to receive the at least one error;
a boost comparator coupled to monitor a state of the boost control loop;
mode control circuitry responsive to the buck and boost comparators and configured to cause the switching circuitry to switch among a pass phase where the first and third transistor switches are ON, a boost phase where the first and fourth transistors are ON and a buck phase where the second and third transistors are ON, with first selected switching periods beginning operation in the pass phase followed, in response to an output of the buck comparator, with operation in the buck phase and with second selected switching periods beginning operation in the pass phase followed, in response to an output of the boost comparator, to operation in the boost phase.

18. The control circuit of claim 17 further including artificial ramp current waveform circuitry configured to produce first and second artificial current ramp signals that are of opposite slopes and are of differing magnitudes at a beginning of each switching period and then cross over one another in terms of magnitude later within each switching period and further including inductor current sense circuitry configured to produce at least one current sense signal and wherein the buck control loop is further connected to receive the first artificial current ramp signal and the at least one current sense signal and wherein the boost control loop is further connected to receive the second artificial current ramp signal and the at least one current sense signal.

19. The control circuit of claim 18 wherein during the first selected switching periods, when the at least one current sense signal matches a first combination of the at least one error output signal together with the first artificial current ramp signal, the buck comparator output causes the switching circuitry to switch from the pass phase to the buck phase and wherein during the second selected switching periods when the at least one current sense signal matches a second combination of the at least one error output signal together with the second artificial current ramp signal, the boost comparator output causes the switching circuitry to switch from the pass phase to the boost phase.

20. The control circuit of claim 19 wherein the inductor current sense circuitry is further configured to produce a first held current signal after the buck comparator output causes the switching circuitry to switch from the pass phase to the buck phase, with the first held current signal being indicative of the inductor current at a point where the switching circuitry switches from the pass phase to the buck phase and is further configured to produce a second held current signal after the boost comparator output causes the switching circuitry to switch from the pass phase to the boost phase, with the second held current signal being indicative of the inductor current at a point when the switching circuitry switches from the pass phase to the boost phase.

21. The control circuit of claim 20 wherein during the first selected switching periods when the first held inductor current signal matches the second combination of signals, the boost comparator causes the switching circuitry to switch from the buck phase back to the pass phase, with a duration of the operation in the buck phase approaching zero as a difference between the output voltage Vout and an input voltage Vin applied to the input voltage terminal becomes smaller; and during the second selected switching periods when the second held inductor current signal matches the first combination of signals, the buck comparator causes the switching circuitry to switch from the boost phase back to the pass phase, with a duration of the operation in the boost phase approaching zero as a difference between the output voltage Vout and the input voltage Vin becomes smaller.

* * * * *